(12) United States Patent
Van Der Burg et al.

(10) Patent No.: US 7,466,672 B2
(45) Date of Patent: Dec. 16, 2008

(54) SYSTEM, TOOL AND METHOD FOR NETWORK MONITORING AND CORRESPONDING NETWORK

(75) Inventors: Johannes Cornelis Van Der Burg, En Monster (NL); Harry Wilhelmus Scheers, MH Spÿkenisse (NL)

(73) Assignee: Koninklijke KPN N.V., The Hauge (NL)

( * ) Notice: Subject to any disclaimer, the term of this patent is extended or adjusted under 35 U.S.C. 154(b) by 854 days.

(21) Appl. No.: 10/441,558

(22) Filed: May 20, 2003

(65) Prior Publication Data

US 2003/0219018 A1 Nov. 27, 2003

(30) Foreign Application Priority Data

May 21, 2002 (EP) .................................. 02076989
Sep. 27, 2002 (EP) .................................. 02079061

(51) Int. Cl.
*H04Q 7/00* (2006.01)
(52) U.S. Cl. ........................................ 370/328; 370/252
(58) Field of Classification Search ................. 370/241, 370/250, 252, 328, 469; 379/32.02, 32.03; 380/255
See application file for complete search history.

(56) References Cited

U.S. PATENT DOCUMENTS

| | | | |
|---|---|---|---|
| 5,715,294 A * | 2/1998 | Pester, III | 379/32.03 |
| 5,793,839 A | 8/1998 | Farris et al. | |
| 5,864,624 A * | 1/1999 | Lukas et al. | 380/255 |
| 5,892,812 A * | 4/1999 | Pester, III | 379/32.02 |
| 6,038,598 A * | 3/2000 | Danneels | 709/219 |
| 6,064,950 A * | 5/2000 | Lehtinen | 702/186 |
| 6,363,056 B1 * | 3/2002 | Beigi et al. | 370/252 |
| 6,381,306 B1 | 4/2002 | Lawson et al. | |
| 6,424,189 B1 * | 7/2002 | Su et al. | 327/141 |
| 6,618,394 B1 * | 9/2003 | Hilleary | 370/469 |
| 6,725,031 B2 * | 4/2004 | Watler et al. | 455/405 |
| 6,831,898 B1 * | 12/2004 | Edsall et al. | 370/256 |
| 6,980,569 B1 * | 12/2005 | Beyda et al. | 370/516 |
| 7,110,391 B1 * | 9/2006 | Rogers et al. | 370/352 |
| 2002/0068544 A1 * | 6/2002 | Barzilay et al. | 455/406 |
| 2002/0106070 A1 * | 8/2002 | Elsey et al. | 379/218.01 |
| 2002/0161767 A1 * | 10/2002 | Shapiro et al. | 707/9 |
| 2002/0166071 A1 * | 11/2002 | Lingafelt et al. | 713/201 |
| 2003/0064720 A1 * | 4/2003 | Valins et al. | 455/423 |

(Continued)

FOREIGN PATENT DOCUMENTS

EP 0 541 145 A1 5/1993

OTHER PUBLICATIONS

The European Search Report for European priority application serial No. 02079061.4, May, 2002.

*Primary Examiner*—Ricky Ngo
*Assistant Examiner*—Kan Yuen
(74) *Attorney, Agent, or Firm*—McDonnell Boehnen Hulbert & Berghoff LLP

(57) ABSTRACT

A system, method and tool for monitoring switching events in a network with at least two nodes, and a corresponding network, the system, method and tool including means for representing the events originated from different nodes as data in a uniform format, and means for counting the occurrence of events in a node of the network wherein switching events being represented as the same data are counted as the same event.

1 Claim, 2 Drawing Sheets

U.S. PATENT DOCUMENTS

| | | | |
|---|---|---|---|
| 2003/0098914 A1* | 5/2003 | Easwar | 348/229.1 |
| 2003/0169487 A1* | 9/2003 | Feldman et al. | 359/341.4 |
| 2004/0078715 A1* | 4/2004 | Vth | 714/43 |
| 2004/0085983 A1* | 5/2004 | Bass et al. | 370/412 |
| 2005/0122909 A1* | 6/2005 | Parupudi et al. | 370/241 |

* cited by examiner

SYSTEM, TOOL AND METHOD FOR NETWORK MONITORING AND CORRESPONDING NETWORK

FIELD OF THE INVENTION

The present invention relates to the field of tools and methods for monitoring the quality of telecommunication networks as perceived by the subscribers of the network. More in particular a tool and a method for monitoring a network being based on the occurrence of switching events in nodes of the network are disclosed.

BACKGROUND OF THE INVENTION

Monitoring tools, methods and systems for monitoring networks, in particular telecommunication networks, are known in the art.

An example of such a system is disclosed in U.S. Pat. No. 6,381,306. U.S. Pat. No. 6,381,306 discloses a system on dedicated signalling links in a network all messages are captured and wherein the messages are processed into Call-Detail-Records (CDR's). The system analyses these CDR's for quality assurance monitoring. As the information is based on CDR's, the information on the network quality is not real-time. Moreover as all messages are captured and call-by-call, customer-by customer information is gathered, the system is vast and expensive and requires a huge processing capacity Another example of such a system systems for monitoring networks is disclosed in European Patent EP 541145. EP 541145 shows a monitoring system that monitors a telecommunication network containing at least one subscriber exchange, based on call records of calls being made by subscribers via such an exchange. Such a monitoring system retrieves information from data based on samples of call records (also known as DRPC: Data-Recording-Per-Call). Typically, the monitoring system of EP 541145 is applied in large networks with a large number of subscriber exchanges. Due to the rather small sampling size per exchange (i.e., the number of sampled call records is small: 10% of all traffic), only for a large number of exchanges the statistical data derived from the call records will be reliable.

Disadvantageously, for relatively small networks such as networks for mobile telephony (with a relatively small number of subscriber exchanges), the system and method of EP 541145 will yield unreliable results. Furthermore, at an increased processor load of an exchange, the DRPC handling tasks of the exchange are reduced in favour of telephony switching tasks, which adversely reduces the sampling size even further to about 2-3% of all traffic. Moreover, as the information is based on CDR's, the information on the network quality is not real-time.

Commercially available tools for (mobile) telecommunication networks may be used for monitoring the performance (or quality) of a network to observe possible obstacles in the system. Typically, such monitoring tools are based on monitoring the network for malfunctions at the level of network elements, Usually, the tool monitors each and every network element such as exchanges, for traffic-related data (e.g., various types of alerts, the amount of traffic on routes, traffic handled by exchanges, etc.). Such action will result in the collection of vast amounts of data. Due to the size, the collected data can not be processed in real-time, and consequently the information from such data will be revealed to operations and service personnel only after a certain period of time. For the purpose of monitoring a network to detect malfunctions in real-time, such a tool from the prior art is not very useful.

Moreover, the vast amount of collected data also requires large investments regarding adequately large storage capacities and computational processing power. It is noted that the content of most of the collected data is not very useful, since the network will be functioning under normal operation conditions during most of the time.

Furthermore, since no real-time information on network quality is available, responding within a short time to cancel out possible malfunctions (or even to act proactively) is not possible, which may affect customer satisfaction: ultimately, customers may stop using the network and switch to a competitor's network.

Also, commercially available tools will only monitor network elements of the same supplier, which means that in most networks, which are multi-vendor-based, a plurality of such monitoring tools will be needed. Disadvantageously, in a multi-vendor-based network the cost of having, maintaining, using all necessary tools, and keeping them up-to-date is high.

Moreover, the training of operations and service personnel for each tool is costly also.

SUMMARY OF THE INVENTION

It is an object of the system and method of the present invention to provide real-time information on network quality in order to have an early warning on possible malfunctions.

The system for network monitoring according to an embodiment of the present invention determines the quality of the network by analysing switching events collected for each call made by subscribers of the network. During the various stages of a call (e.g., set-up of connection, connection phase, closing connection) and/or as a result of a plurality of calls, the network elements that carry the connection generate a plurality of switching events, which are counted in a counter for each switching event. The counted data are analysed and the analysis is targeted to specific switching events that relate to information on the handling of a call and its routing through the network. By monitoring the counter, or optionally a plurality of these counters in a central depository, a statistical overview can be obtained on the quality of the network as perceived by subscribers of the network. Since the collecting of data can be done at regular short intervals the statistical overview can be obtained in almost real-time, which allows for a quick and almost direct response in case of malfunctions. Optionally the data are counted locally and at regular intervals the value of the counters stored in all network elements is transmitted to a central depository, where a database is formed containing each counter and its value.

In a first aspect of the present invention, a system is disclosed for monitoring switching events in a network with at least two nodes, the system comprising means for representing the events originated from different nodes as data in a uniform format; and means for counting the occurrence of events in a node of the network as the counting of said data wherein switching events being represented as the same data are counted as the same event. Thus the system of the invention handles reduced information from the network. The expression 'events originated from different nodes' also includes events that are handled or routed through or over the node switching events include routing events. In a preferred embodiment of the invention, switching events having the same routing destination are represented as the same data. The system of the invention can be integrated in mobile communications network wherein said nodes are switching centres. According to the above-described preferred embodiment of the invention, said network furthermore can be a network for communication between a first communication device and a second communication device, the network comprising network elements and a switching centre management system, the network elements being linked together and comprising switching centres as said nodes and said centres being arranged, in use, to generate at least one switching event to the other network elements during a connecting phase of the communication between the first communication device and the second communication device, and the switching centre being arranged to count the switching events, and wherein the switching centre management system is being connected to the at least one switching centre and being arranged to read the values of the switching event counters, and wherein the system is arranged to perform the representation of the switching events in said uniform format to obtain classified switching events by using number analysis of a phone number selected by the first communication device to address the second communication device during the connecting phase, in the sequel according to the best-mode embodiment also referred to as B-number analysis. The classified switching events can be divided into at least two of the following categories traffic destinations of the phone number selected traffic signalling relating to traffic management functions for the communication between the first and second communication device processing load of the at least one mobile switching centre.

According to another preferred embodiment of the invention, the system only counts a subset of said events, said subset being defined based on the network quality perception of a subscriber of the network. The counted data furthermore can be processed according to predetermined rules and the processed data can be compared with threshold levels. The system can comprise means for adapting said threshold levels on-line depending on the analysis of the processed data. The counting data and/or the processed data can be listed in separate object-types of events.

According to yet another embodiment of the invention, the system can also comprise a control computer system (CPC) and at least one information management system (IM1), the control computer system (CPC) comprising a processor (21), memory units (18, 19, 22, 23, 24), and an input/output port (31), the processor (21) being connected to the memory units (18, 19, 22, 23, 24) and to the input/output port (31), the control computer system further being arranged to communicate via the input/output port (31) to the switching centre management system (SCMS) and to the at least one information management system (IM1) which is capable of displaying information related to the classified switching event counters.

Embodiments made according to the invention enable to present the analysed data in a simple and advanced way (graphical) that end-users have direct and realtime view on the quality of if preferred the whole network as perceived by the customers on the network. This can be realised by processing an alert output file towards a graphical output for end-users or a network quality monitoring team In a second aspect of the present invention, a network for mobile communication with at least two nodes is disclosed, the network comprising a system for monitoring switching events in the network, the system comprising means for representing the events originated from different nodes as data in a uniform format; and means for counting the occurrence of events in a node of the network wherein switching events being represented as the same data are counted as the same event.

In a third aspect of the present invention, a tool is disclosed for monitoring switching events in a network with at least two nodes, the tool being compiled on a computer environment or stored on a memory carrier, the tool comprising:

means for representing the events originated from different nodes as data in a uniform format; and means for counting the occurrence of events in a node of the network wherein switching events being represented as the same data are counted as the same event.

In a fourth aspect of the present invention a method is disclosed for monitoring switching events in a network with at least two nodes, the method comprising the steps of:

representing the events originated from different nodes as data in a uniform format; and counting the occurrence of events in a node of the network wherein switching events being represented as the same data are counted as the same event.

In a fifth aspect of the present invention, a method is disclosed for improving the quality of a network with at least two nodes, the method comprising the steps of:

monitoring switching events in the network;

representing the events originated from different nodes as data in a uniform format; and counting the occurrence of events in a node of the network wherein switching events being represented as the same data are counted as the same event processing the counted data according to predetermined rules;

comparing the processed data with threshold levels; and adapting the network elements based on an analysis of the number of times threshold levels have been passed.

In comparison to the network monitoring systems from the prior art, the system according to the present invention has the advantage that the amount of data that needs to be analysed is relatively small. Therefore, the time needed for processing is short and information on the network quality can be obtained in almost real-time.

The aspects, features and embodiments as disclosed on the present patent application can be combined. Further advantages with respect to the invention will be explained with reference to the description of preferred embodiments.

BRIEF DESCRIPTION OF DRAWINGS

Below, the invention will be explained with reference to some drawings, which are intended for illustration purposes only and not to limit the scope of protection which will be defined in the accompanying claims.

DESCRIPTION OF PREFERRED EMBODIMENTS

For the purpose of teaching of the invention, preferred embodiments of the method and devices of the invention are described in the sequel. It will be apparent to the person skilled in the art that other alternative and equivalent embodiments of the invention can be conceived and reduced to practice without departing form the true spirit of the invention, the scope of the invention being limited only by the appended claims as finally granted.

Figure 1:
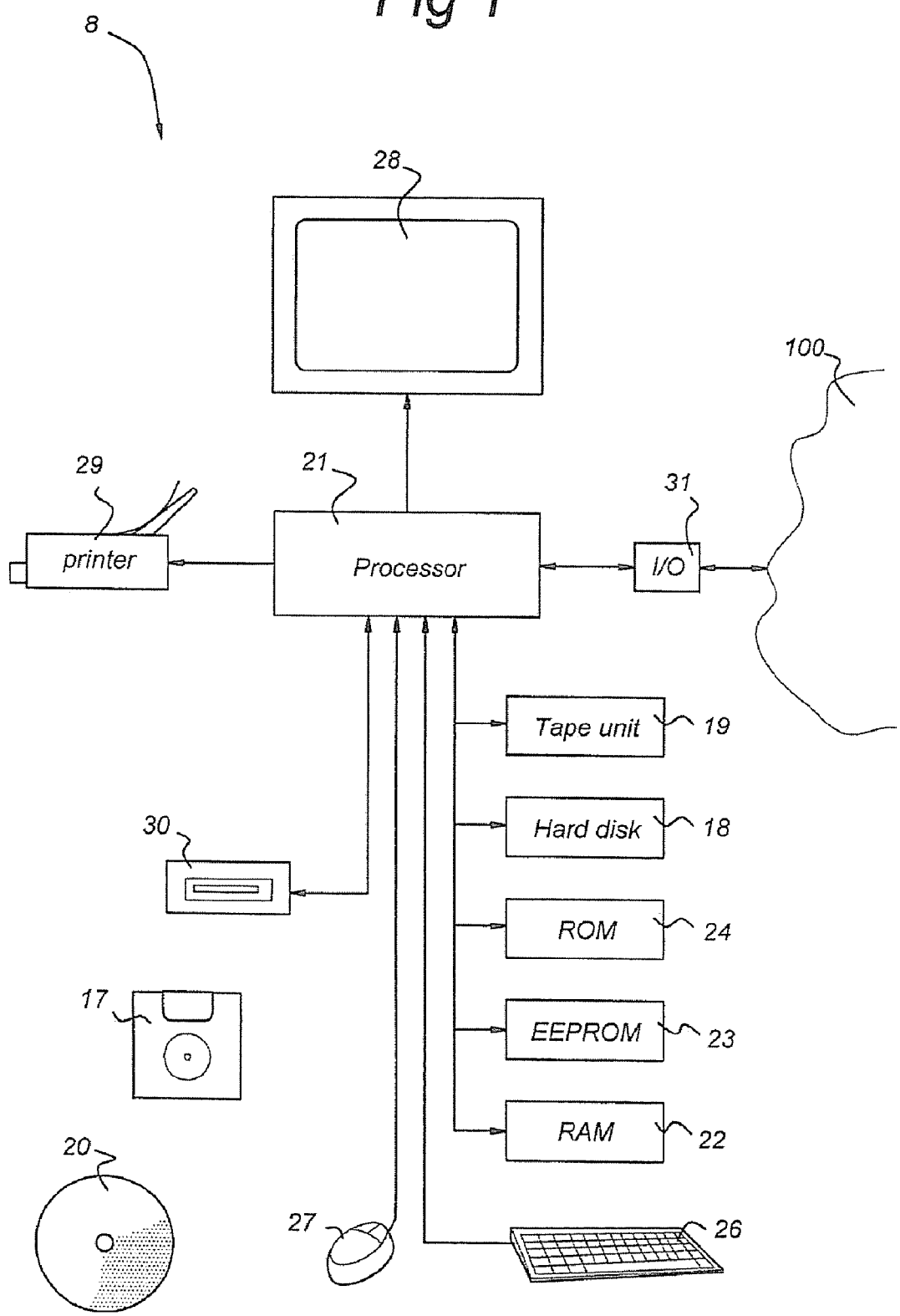
FIG. 1 shows schematically a telecommunication network in which the system and method for monitoring networks according to the present invention is implemented.

FIG. 1 shows schematically a telecommunication network in which the system and method for monitoring networks according to the present invention is implemented. The telecommunication network shown as example in FIG. 1 relates to a telecommunication network for mobile telephony such as GSM. It is noted that the system and method for monitoring networks according to the present invention may also be used in a telecommunication network for wired telephony. The telecommunication network 1 comprises a plurality of network elements: e.g., base transceiver stations BTS, base station controllers BSC, mobile switching centres MSC, gateways GW, voice mail systems VM, short message service centre SMSC and prepaid gateways PGW. The telecommunication network 1 encompasses a radio-based network for wireless communication and a backbone network BBN which connects the network elements internally.

Further, the telecommunication network 1 comprises network element management systems NEMS for monitoring network elements in the network 1. The network element management systems NEMS typically comprise systems for radio traffic management RTMS, switching centre management SCMS and traffic signalling management TSMS. Also, the telecommunication network 1 comprises network management systems NMS, which monitor the network as a whole.

The switching centre management system SCMS is further connected to a control computer system CPC. The network 1 handles communication between two parties, shown here as mobile communication devices MCA, MCB, which are connected for communication via a route through the network 1. The communication comprises not only the exchange of signals (speech or data) between the parties, but also the exchange of controlling C7 signals generated by the network elements on the route between MCA and MCB.

A base transceiver station BTS for wireless connecting to mobile communication devices MCA, MCB, is connected to a base station controller BSC. Typically, a single base station controller BSC is capable of controlling traffic from a plurality of base transceiver stations BTS and provides a connection to the backbone network BBN for those base transceiver stations BTS.

Next, each base station controller BSC is connected to a mobile switching centre MSC, which functions as an exchange in the network. Mobile switching centres MSC are connected among themselves. Further, a connection between MSCs and voicemail system VM is provided as well as a connection of the MSCs to prepaid gateway PGW, which provides access to prepaid services (i.e., the network for prepaid subscribers). Finally, MSCs are connected to gateway system GW, which provides access to e.g., the public switching telephone network PSTN, other local operators OLO, and international operators IO, which provide further connections ABROAD, outside of the network 1.

Typically, a telecommunication network 1 comprises many network elements, e.g., a few thousand BST, a few hundred BSC, and a few dozen MSC. Several million subscribers may be using such a network on a regular daily basis.

The control computer system CPC is linked to the switching centre management system SCMS, for reading information stored in SCMS. Further, the control computer system CPC is linked through a network to a plurality of information management systems IM1 . . . IMn, e.g., personal computers, or electronic devices capable of displaying information items like WAP or i-mode (or any other wireless Internet protocol) telephones, pagers, palmtop computers, etc.

In the prior art, in a network monitoring traffic on network element level was done by measuring traffic-related parameters on each network element by the network element management system NEMS. For instance, the switching centre management system SCMS monitors all MSCs in the network by retrieving the traffic-related parameters stored in a memory of each MSC. All these data are collected by the SCMS and stored in a database file. In the given example for a network 1, the total amount of traffic-related data generated in the network elements may already be huge (several dozen Gb). Then, the data are processed off-line for further analysing. As mentioned above, monitoring the network in this manner is tedious, inefficient and not real-time.

As mentioned above, in the prior art, the data collected is related to the traffic on network element level. The present invention is based a.o. on the notion that network quality may be measured by monitoring the handling of phone calls from the subscribers by the network. In other words, the network quality should be measured as it is perceived by subscribers. Basically, when a subscriber A calls a subscriber B, the fact that whether or not the call is made by the network, will affect the subscriber. The perception of the subscriber whether making a call is successful (or not, or maybe after several unsuccessful efforts) is taken as a measure for the quality of the network.

In the telecommunication network 1 all traffic (i.e., subscriber commands, services, and voice- and data communication) will be handled by at least one switching centre MSC in the network 1.

In mobile switching centres MSC, e.g. AXE switching centres manufactured by Ericsson, counters for specific switching events can be defined in the statistical traffic subsystem STS. It is noted that many prior art switching centres MSC are capable of coupling the occurrence of a specific switching event to a measuring counter for that event.

As a first step in the present invention, basic classification for switching events is performed by using the analysis of entered phone numbers (B-num analysis).

B-num analysis verifies the validity of a phone number while it is entered, by comparing if a sequence of digits as entered yields a combination that represents an valid address for a subscriber B (or e.g. a service). Typically, a verification is done for the first 4 to 6 digits of a phone number.

The subscriber A using mobile communication device MCA interacts with the network by simply entering a phone number of a subscriber B using another mobile communication device MCB in the same network 1. By typing the phone number on MCA, each digit of the number triggers at least one switching event in at least one mobile switching centre MSC to establish a connection between MCA and MCB. The MSC analyses the entry by subscriber A, and can make a direct classification whether the entered phone call is valid and if so, what the destination of the phone call will be.

It is known to persons skilled in the art that entering a phone number may cause over a thousand switching events to establish a connection between MCA and MCB. It is noted that in this manner, also information on switching events from within the network 1 to network elements outside the network can be obtained, since a switching event starting in the network will receive a response from network elements that are linked in the connection to the destination of the phone call entered by a subscriber of the network. Similarly, a phone call incoming from outside the network 1 will also generate switching events inside the network.

By carefully defining a set of switching events that may provide useful information on the status of a call, and setting counters in the STS of a switching centre MSC for these switching events, statistical data on the handling of a call in the network 1 can be obtained. Such data from the mobile switching centre can be retrieved by the switching centre management system SCMS and stored in the memory of the switching centre management system SCMS, preferably as a traffic database file TDB.

As a second step in the present invention, the classification is extended by using identical STS counters for identical switching events that occur in all mobile switching centres of the network 1. By uniformity of the counters, i.e., defining a standard counter for a switching event for all switching centres MSC in this way, one counter is available for a specific switching event irrespective of the location of its occurrence in the network 1. Each specific switching event has a single dedicated code in the STS. When the SCMS reads out the switching events collected by each MSC, all data relating to a specific switching event may be added.

The present invention thus allows that the quality of specific traffic handling events by the network as a whole can be determined.

However, as a third step, the present invention recognises that beyond the definition of useful switching events, a further classification can be made that provides an abstraction in the form of classes of switching events. In the present invention, the classes of switching events are each represented by an object-type in the STS. An object-type is function-related: i.e., the switching events of a certain object-type relate to a particular functionality in the network.

Each class of switching events (object-type) represents a certain type of switching events that relates to particular aspects of traffic on the network. Classes of switching events can be defined for e.g., traffic destination, traffic signalling events, processor loading, and route monitoring. In each class a further grouping of switching events is done for particular entities in that class.

By grouping switching events according to function-related object-types, the network traffic is moulded in an hierarchical structure which allows retrieval of generically interpretable network management information.

In the following this classification will be described in more detail.

The class of traffic destination related switching events can be described as follows. The aforementioned number analysis procedure provides a method to couple in each MSC (or network element) one or more switching events needed for a traffic destination to a corresponding traffic destination code (an entity). Thus: a group of switching events is defined as an entity in the traffic destination class for a specific traffic destination. Due to the definition of an STS counter for each switching event in the group, an entity in the traffic destination class is represented by a set of STS counters.

Such an entity is unique: for a traffic destination an entity may be a specific city, a specific network (e.g., prepaid), a specific service (e.g., voicemail), but it may also be a switching event related to a specific network element of the telecommunication network 1 (e.g., a specific switching centre at a specific location, a gateway to the PSTN network, an international gateway, a specific BSC, etc.).

By using a uniform definition of entities for traffic destinations in all MSCs of the network 1, analysis of such entities by their related STS counters will simplify the detection in the network 1 of a malfunction, which relates to, for example, congestion on a route to a specific area code. This will be described later in more detail.

Similarly, entities can set-up for traffic signalling events, such as the C7 ("common channel signalling 7") protocol, which relate to traffic management functions in the network 1. For example, such traffic signalling events may be specific switching events that address the access to specific network elements in the network. In this manner, the quality of traffic through such a network element may be monitored.

Also, entities may be defined for events that relate to the processing load on a network element.

Moreover, entities relating to route monitoring can be defined by grouping those switching events that contain information on the routing of traffic through the network.

Many entities can be defined in each class of switching events. As explained above, in a MSC each entity will represented by a group of dedicated STS counters.

AXE systems provides about 64,000 definable counters. Depending on the actual experience of the operator a carefully designed smaller set of STS counters that relate to useful information on the network traffic may be sufficient.

In the present invention, a selection of STS counters is defined that, in one respect provides sufficient information on the network quality, and in another, comprises a relatively small file size in comparison to the vast mount of data generated in prior art network monitoring systems.

For each entity such a set comprises for example the following counters:

| | |
|---|---|
| ROUTE | Name of route |
| NDEV | Number of network elements (NE) in route |
| NBLOC | Number of blocked NE in route |
| TRALI | Number of NE occupied by incoming calls |
| TRALO | Number of NE occupied by outgoing calls |
| NCALLSI | Number of incoming call requests |
| NCALLSO | Number of outgoing call requests |
| NOVERFLOWO | Number of outgoing connections in congestion |
| NOVERFLOWI | Number of incoming connections in congestion |
| NANSWI | Number of incoming call responses |
| NANSWO | Number of outgoing call responses |
| NTRALACCI | Measured call duration on incoming traffic |
| NTRALACCO | Measured call duration on outgoing traffic |
| NSCAN | Number of measuring periods |
| NOSEIZ | Number of outgoing connections |
| THROUGHRTCNT | Number of throughconnect events |

In summary, traffic on the telecommunication network 1 is classified by switching events in the network generated during the interaction of a subscriber with the network during the dialling phase, and the speech phase of his phone call. The classification is made for a number of classes that relate to e.g., traffic destination, traffic signalling, processor loading and route monitoring. Within each class entities are defined: e.g. specific destinations, specific (groups of) signalling events, specific network elements with a specific purpose.

Each entity is linked to switching events specific for that entity. In each MSC of the network for all entities the switching events have been linked to STS counters that count the occurrence of these switching events. The STS counters are stored in the memory of each MSC. The switching centre management system SCMS is capable of retrieving the values stored in the STS counters, collects these values and stores them in a memory of the SCMS, preferably in a traffic database file.

Typically, the action of the SCMS may be performed on a regular interval of e.g. every 5 minutes. After retrieving the STS counter data from an MSC, the STS counters in that MSC are reset to zero.

Moreover, the STS counters are defined network-wide, i.e., counters are used uniformly in the network 1. A specific class entity is defined in an identical manner in each MSC. Due to the uniformity of the switching events and the linked STS counters for these switching events and due to the small set of switching events to be observed, the amount of data in the traffic database file TDB is relatively small.

Further, since class entities are identical, the values retrieved by the SCMS from various MSCs, may be added by the SCMS and stored as a single value in the traffic database file TDB.

Typically, a traffic database file for the complete telecommunication network 1 which comprises all collected STS counter data for a single time interval of, say, 5 min. may have a size of few dozen Kb.

In the present invention, the control computer system CPC is connected to the SCMS, preferably over a network, and capable of reading the traffic database file stored in the memory of the SCMS.

Figure 2:
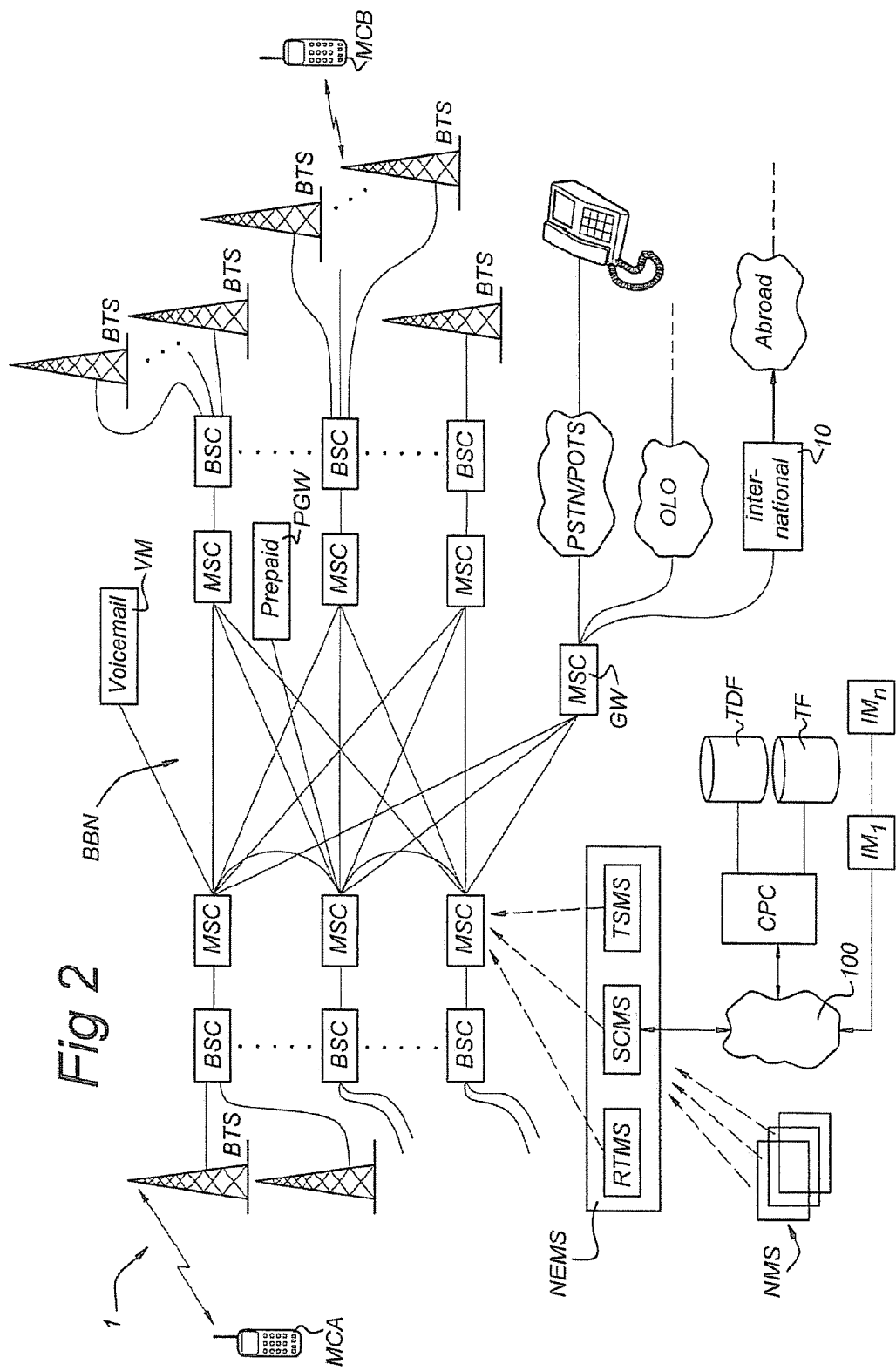
FIG. 2 shows a schematic diagram of a control computer system CPC as used in the present invention.

FIG. 2 shows a schematic diagram of a control computer system CPC as used in the present invention.

The control computer system CPC 8 comprises a host processor 21 with peripherals. The host processor 21 is connected to memory units 18, 19, 22, 23, 24 which store instructions and data, one or more reading units 30 (to read, e.g., floppy disks 17, CD ROM's 20, DVD's, etc.), a keyboard 26 and a mouse 27 as input devices, and as output devices, a monitor 28 and a printer 29. Other input devices, like a trackball, a touch screen or a scanner, as well as other output devices may be provided.

The input/output (I/O) device 9 is provided for a connection to a network 100 for data-communication over the network 100.

The memory units shown comprise RAM 22, (E)EPROM 23, ROM 24, tape unit 19, and hard disk 18. However, it should be understood that there may be provided more and/or other memory units known to persons skilled in the art. Moreover, one or more of them may be physically located remote from the processor 21, if required.

The processor 21 is shown as one box, however, it may comprise several processing units functioning in parallel or controlled by one main processor, that may be located remotely from one another, as is known to persons skilled in the art.

The processor 21 of the control computer system CPC retrieves the data from the traffic database file TDB from the SCMS and stores them as traffic data in its memory 18, 19, 22, 23, 24.

Further, the memory 18, 19, 22, 23, 24 comprises a threshold data file TF that comprises a list of thresholds for each entity in the traffic database file TDB. The threshold for each entity relates to a specific value that indicates that the value of a STS counter for that entity is out-of-range (either a lower or an upper threshold), which may indicate a malfunction for the related entity. It is noted that the thresholds in the threshold data file TF can be set by an operator in accordance to his specific experience and insights. The thresholds in the threshold data file may also have different values in different traffic-related situations, e.g., during a certain time of the day, a specific day of the week, on specific dates.

The processor 21 uses a set of algorithms to process the data in the traffic database file TDB. From the values of the STS counters the processor 21 of the control computer system CPC can calculate the following information for monitoring:

1. percentage of answered phone calls, in total, by kind (e.g., mobile to mobile, mobile to PSTN/POTS, mobile to international, etc.), by destination (e.g., incoming outgoing, traffic to specific area codes), by service (to prepaid, to voicemail, etc.);
2. percentage of congested phone calls;
3. duration of a phone call;
4. comparison of traffic amount generated by subscribers and traffic amount handled by MSCs;
5. amount of incoming and outgoing traffic to a specific platform: e.g., prepaid;
6. traffic signalling functions to access traffic destinations;
7. processor loading of MSCs;
8. access to BSCs;
9. "mass-call" behaviour of subscribers;
10. network behaviour after a change of configuration of network elements;
11. completion of International traffic calls according to preset standards.

As an illustration a few possible indicator numbers are discussed here:

A mean time for occupation of a destination (MHTIME) can be calculated for a measuring period (MPER) as the quotient of the call duration time (TRAL) and the number of occupations for that destination (NBIDS) as $$MHTIME=(MPER*TRAL)/NBIDS$$

A mean percentage of answered calls (MPAC) for e.g., a destination during a measuring period is useful for detection of short-period connections. MPAC may be defined by the quotient of the number of unanswered calls (NANSW) and the number of successful occupations (i.e., the difference between the number of occupations (NBIDS) and the number of failed connections (NUNSUCC) as $$MPAC=100*NANSW/(NBIDS-NUNSUCC).$$

A percentage of congestion per destination (CONDEST) may be defined by the quotient of the number of failed connections (NUNSUCC) and the number of occupations (NBIDS) as $$CONDEST=100*NUNSUCC/NBIDS.$$

For monitoring certain types of traffic it may be useful to test if the number of occupations on a destination (NBIDS) is above a certain limit (LIMBID, stored as a testvalue in the threshold data file):

$$NBIDS>LIMBID$$

In route monitoring, determining a percentage of outgoing forwarded connections is useful to detect malfunctions in e.g. B-number analysis. This percentage of outgoing forwarded connections (PEROFC) may be calculated as the quotient of the number of outgoing forwarded connections (THRURTECNT) and the number of outgoing connections (NOSEIZ) on that route as $$PEROFC=100*THRURTECNT/NOSEIZ.$$

Congestion on incoming and outgoing connections (INCCON and OUTCON, respectively) can be calculated by:

$$INCCON=100*NOVERFLOWI/NCALLSI,$$

and $$OUTCON=100*NOVERFLOWO/NCALLSO,$$

where NOVERFLOWI and NOVERFLOWO are the respective numbers of incoming and outgoing connections in congestion, and NCALLSI and NCALLSO are the respective numbers of incoming and outgoing call requests. A test of the value of INCCON and/or OUTCON with a variable for a predetermined congestion level (in the threshold data file) can provide information (e.g. an alert) whether to much incoming or outgoing congestion occurs on a route.

A percentage of answered incoming connections (PERACI) can be calculated as $$PERACI=100*NANSWI/(NCALLSI-NOVERFLOWI),$$

where NANSWI is the number of answered incoming connections.

A percentage of answered outgoing connections (PERACO) can be calculated as $$PERACO=100*NANSWO/(NCALLSO-NOVERFLOWO),$$

where NANSWO is the number of answered outgoing connections. If the percentage of answered incoming or outgoing connections is below a certain value as defined by a respective test-variable (in the threshold data file) for incoming or outgoing connections, a malfunction in the overall process of setting up connections may have occurred and a related alert can be generated for monitoring.

A further test can be performed on traffic to a specific service such as a "prepaid" platform. If the ratio of outgoing connections (PPO) and incoming connections (PPI) of the prepaid platform is below a certain test-value in the threshold data file (PPVAL), an alert may be generated to monitor a malfunction in the prepaid platform:

$$(PPO/PPI) \times 100\% < PPVAL$$

In this monitoring procedure, the processor 21 of the CPC 8 compares all calculated information with the threshold values set in the threshold data file TDF. If a calculated value is within the limit(s) set by it respective threshold value(s), the processor 21 can drop the calculated value. Only a calculated value that is out-of-range, needs to be handled further by the processor 21. In the latter case, the processor 21 stores the out-of-range calculated value in a record for the entity related to that calculated value in an alert database file. By handling only entities with out-of-range data, the amount of information that needs to be processed further, is strongly reduced, which will facilitate, in comparison to the prior art, a faster processing and a reduced processing time.

After determining all entities which may have some malfunction, the processor 21 processes an output alert file for the information stored in the alert database file.

Since the STS counters are preferably set to zero, after read-out by the switching centre management system SCMS, the output alert file will comprise only the STS counter data of the last measurement period.

Next, the processor 21 of the control computer system CPC is capable of sending the information of the output alert file to the network-element management system (SCMS) or a data-collection server.

The information management systems IM1 . . . IMn are arranged to collect the output alert file from the network-element management system (SCMS) or a datacollection server.

The processor of each information management system is capable to display the information of the output alert file to a person using the information management system.

Since the output alert file comprises only data on possible malfunctions, the information management system IM1 . . . IMn only needs to process the available data as an indication for malfunctions. No additional analysis is necessary.

To have an historic overview of alerts in the network 1, the control computer system CPC may be arranged to maintain a history file which shows the content of the output alert file as a function of time.

The displayed information can be graphical: e.g., displaying a geographical map showing the locations of MSCs in the network 1, or some other graphical output such as a histogram or a line graph. Possible malfunctions are clearly indicated by some markings in the respective graph.

Additionally, the displayed information may be text-based: e.g., a message list shown in a window on the display of the information management system.

In comparison to the network monitoring systems from the prior art, the system according to the present invention has the advantage that the amount of data that needs to be analysed is relatively small. The system of the invention handles reduced information from the network. Therefore, the time needed for processing is short and information on the network quality can be obtained in almost real-time.

What is claimed is:

1. A system for monitoring switching events in a network with at least two nodes, the system comprising:

means for counting the switching events originated from different nodes as data in a uniform format; and means for counting occurrence of the switching events in the different nodes of the network as the counting of data, wherein the switching events being represented as the same data are counted as the same event, wherein the network is a network for communication between a first communication device and a second communication device, the network comprising network elements and a switching center management system, the network elements being linked together and comprising switching centers as the different nodes and the switching centers being arranged, in use, to generate at least one switching event to other network elements during a connecting phase of the communication between the first communication device and the second communication device, and the switching centers including switching event counters for counting the switching events, wherein the switching center management system is being connected to at least one switching center and being arranged to read the values of the switching event counters, wherein the switching center management system is arranged to perform the representation of the switching events in the uniform format to obtain classified switching events by using number analysis of a phone number selected by the first communication device to address the second communication device during the connecting phase, wherein the classified switching events are divided into at least two of the following categories:

traffic destinations of the phone number selected, traffic signaling relating to traffic management functions for the communication between the first and second communication device, and processing load of the at least one mobile switching center, and wherein the network further comprises a control computer system (CPC) being arranged to carry out the following procedure:

reading the values of the classified switching event counters from the switching center management system (SCMS), storing the read values of the classified switching event counters in a traffic database file (TDF) in a plurality of memory units of the CPC, comparing the values of the classified switching event counters in the TDF with respective threshold values stored in a threshold data file (TF) in the plurality of memory units, for determining if the value of a classified switching event counter is within a normal operating range, storing the value of the classified switching event counter in an output alert file, if the value of the classified switching event counter is out-of-normal-operating-range, outputting the stored values of classified switching event counters in the output alert file to the SCMS, and collecting the output alert file by at least one information management system.

\* \* \* \* \*